(12) United States Patent
Murayama et al.

(10) Patent No.: US 6,781,592 B2
(45) Date of Patent: Aug. 24, 2004

(54) IMAGE GENERATING DEVICE, IMAGE GENERATING METHOD, READABLE STORAGE MEDIUM STORING IMAGE GENERATING PROGRAM, AND VIDEO GAME DEVICE

(75) Inventors: Hisashi Murayama, Ohtsu (JP); Junji Maruhashi, Osaka (JP)

(73) Assignee: Konami Corporation, Tokyo (JP)

( * ) Notice: Subject to any disclaimer, the term of this patent is extended or adjusted under 35 U.S.C. 154(b) by 210 days.

(21) Appl. No.: 09/842,890

(22) Filed: Apr. 26, 2001

(65) Prior Publication Data
US 2001/0035867 A1 Nov. 1, 2001

(30) Foreign Application Priority Data
Apr. 26, 2000 (JP) ........................... 2000-125260

(51) Int. Cl.[7] ................................................ G09G 5/00
(52) U.S. Cl. ..................... 345/585; 345/419; 345/584; 345/630; 463/32
(58) Field of Search ..................... 345/419, 420, 345/582, 583, 585, 630, 629, 584; 463/31, 32

(56) References Cited

U.S. PATENT DOCUMENTS

| | | | |
|---|---|---|---|
| 6,030,289 A | * | 2/2000 | Nomi et al. .................. 463/32 |
| 6,078,334 A | * | 6/2000 | Hanaoka et al. ............. 345/584 |
| 6,121,977 A | * | 9/2000 | Arai et al. ................... 345/619 |

FOREIGN PATENT DOCUMENTS

| | | | |
|---|---|---|---|
| EP | 0782104 | 7/1997 | |
| EP | 0817129 A2 | * 1/1998 | ........... G06T/15/50 |
| EP | 0817129 | 7/1998 | |
| JP | 07-057117 | 3/1995 | |
| JP | 09-044698 | 2/1997 | |
| JP | 10124700 | 5/1998 | |
| JP | 10198819 | 7/1998 | |
| JP | 10-198819 | 7/1998 | |
| JP | 10-232943 | 9/1998 | |
| JP | 10-283500 | 10/1998 | |
| JP | 11-025286 | 1/1999 | |

* cited by examiner

Primary Examiner—Matthew C. Bella
Assistant Examiner—Antonio Caschera
(74) Attorney, Agent, or Firm—Jordan and Hamburg LLP

(57) ABSTRACT

An image generating device for displaying a model comprised of a plurality of polygons set in a virtual 3D space and simulating an object having at least one flat plane, the image generating device comprises: polygon storage means for storing coordinates of uneven polygon set; texture storage means for storing object textures to be adhered to the respective polygons of the uneven polygon set; coordinate processing means for moving the uneven polygon set by a specified amount in a specified direction; and texture displacement control means for displacing the adhering coordinates of the object textures to the respective polygons by the specified amount in an opposite direction from the specified direction.

13 Claims, 10 Drawing Sheets

IMAGE GENERATING DEVICE, IMAGE GENERATING METHOD, READABLE STORAGE MEDIUM STORING IMAGE GENERATING PROGRAM, AND VIDEO GAME DEVICE

The present invention relates to a device and an apparatus for displaying a thin model set in a virtual three-dimensional space and simulating a thin object (or an object having at least one planer surface) on a display means, a readable storage medium storing an image generating program and a video game device.

BACKGROUND OF THE INVENTION AND RELATED ART STATEMENT

A huge number of game systems have been proposed. These systems include systems comprised of a special device for home use and a television monitor and systems comprised of a special device for business use, a personal computer or a workstation, a display and a sound output device.

Any one of these systems includes a controller used by a game player for operation, a storage medium storing game program data, a CPU for executing controls to generate images and sounds based on the game program data, a processor for generating images, a processor for generating sounds, a monitor for displaying images, and a loudspeaker for outputting sounds. CD-ROMs, semiconductor memories, cassette-type storage mediums having a built-in semiconductor memory are frequently used as the above storage medium.

In such game systems, a video game in which a model (such as a thin plate like model but not limited thereto) simulating an object having at least one flat plane such as a flag fluttering in the wind or a bottom wall of a swimming pool is displayed in a three-dimensional manner may be considered to be executed. In such a case, it is generally considered to form a thin model by using polygons and adhering textures representing, for example, a flag or a bottom wall to the respective polygons and display the thus formed thin model. In such a display, it is desired to realistically display a state of the flag fluttering in the wind or a swaying state of a pattern (e.g. course lines) of the bottom wall which is caused by a change in refractive index by waves on the water surface.

Strict calculation of the fluttering state of the flag based on the wind velocity and direction of the wind and strict calculation of a change in refractive index caused by the waves on the water surface exert an excessive calculation load on a CPU for the video game which is required to be fabricated at a cost of a specified level or lower.

SUMMARY OF THE INVENTION

In view of the above situation, an object of the present invention is to provide image generating device and method capable of easily and realistically displaying a model simulating an object having at least one flat plane, a readable storage medium storing an image generating program and a video game device.

In order to fulfill the above object, according to the present invention, an image generating device for displaying a model comprised of a plurality of polygons set in a virtual 3D space and simulating an object having at least one flat plane, comprises: polygon storage means for storing coordinates of uneven polygon set formed by arranging the plurality of polygons so as to be uneven with respect to one plane, texture storage means for storing object textures to be adhered to the respective polygons of the uneven polygon set, coordinate processing means for moving the uneven polygon set by a specified amount in a specified direction, image processing means for adhering the object textures to the respective polygons of the uneven polygon set, and texture displacement control means for displacing the adhering coordinates of the object textures to the respective polygons by an amount substantially equal to said specified amount in a direction substantially opposite from said specified direction in which the uneven polygon set is moved when the object textures are adhered to the respective polygons of the uneven polygon set.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
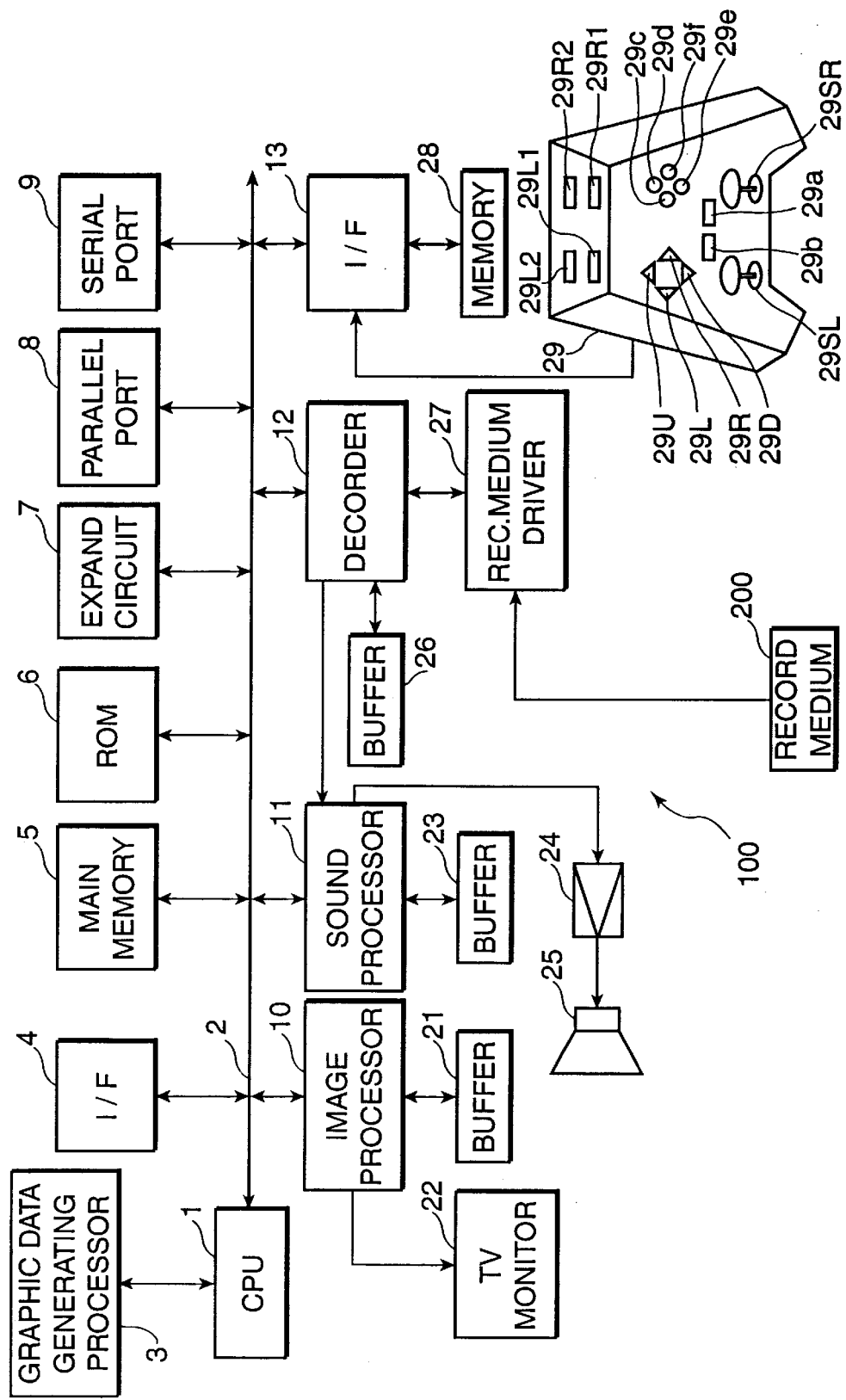
FIG. 1 is a construction diagram showing an electrical construction of a game system as one embodiment of a video game device according to the present invention.

FIG. 1 is a diagram showing an electrical construction of a game system as one embodiment of a video game device according to the present invention.

This video game system is provided with a game main unit 100 and a storage medium 200 storing program data. The game main unit 100 is comprised of a CPU 1, a bus line 2 including an address bus, a data bus and a control bus connected with the CPU 1, a graphic data generating processor 3 and elements connected with the bus line 2.

An interface circuit 4, a main memory 5 including a RAM, a ROM 6, an expanding circuit 7, a parallel port 8, a serial port 9, an image processor 10, a sound processor 11, a decoder 12, and an interface circuit 13 are connected with the bus line 2.

A buffer 21 and a television monitor (hereinafter, merely "monitor") 22 are connected with the image processor 10, and a buffer 23 is connected with the sound processor 11. A loudspeaker 25 is also connected with the sound processor 11 via an amplifying circuit 24. A buffer 26 and a storage medium driver 27 are connected with the decoder 12, and a memory 28 and a controller 29 are connected with the interface circuit 13.

This game system has different modes according to its application. For example, the monitor 22, the loudspeaker 25 and the game main unit 100 are separate in the case of constructing this game system for home use. On the other hand, all the elements shown in FIG. 1 are contained as a unit in a casing in the case of constructing this game system for business use.

In the case that this video game system is constructed with a personal computer or a workstation as a core, the monitor 22 corresponds to a computer display, the image processor 10, the sound processor 11 and the expanding circuit 7 respectively correspond to part of the game program data stored in the storage medium 200 or hardware on an extension board mounted on an extension slot of the computer, and the interface circuits 4, the parallel port 8, the serial port 9 and the interface circuit 13 respectively correspond to hardware on the extension board mounted on the extension slot of the computer. Further, the buffers 21, 23, 26 correspond to the main memory 5 or the respective areas of an extension memory (not shown).

A case where this video game system is constructed for home use is described in this embodiment.

Next, the respective elements shown in FIG. 1 are described. The graphic data generating processor 3 acts as, so to speak, a coprocessor of the CPU 1. Specifically, the graphic data generating processor 3 performs a coordinate-transform and a light source calculation, e.g. calculation of matrices and vectors of the fixed-point system by parallel processing. Main processings performed by the graphic data generating processor 3 are to obtain an address of an image to be processed in a display area based on coordinate data of vertices of an image data fed from the CPU 1 in a two-dimensional (2D) or three-dimensional (3D) space and data on the movement amount and the rotation amount of this image data and return the obtained address to the CPU 1, and to calculate a luminance of an image according to a distance from a virtually set light source.

The interface circuit 4 is for peripheral devices including, for example, a mouse, a trackball or like pointing device. In the ROM 6 are stored program data as an operating system of the game system. This operating system corresponds to a basic input/output system (BIOS) in a personal computer.

The expanding circuit 7 expands a compressed image by intra-coding based on the moving picture engineering group (MPEG) for animated images and the joint picture engineering group (JPEG) for still images. The expanding processing includes decoding (decoding of a data encoded by a variable length code (VLC)), reverse quantization, inverse discrete cosine transform (IDCT), restoration of an intra-image, etc.

The image processor 10 applies an image generating processing to the buffer 21 at intervals of a predetermined time T (one frame, e.g. T=1/60 sec.) based on an imaging command issued by the CPU 1.

The buffer 21 includes, for example, a RAM and is comprised of a display area (frame buffer) and a non-display area. The display area has a development area where a data to be displayed on a display surface of the monitor 22 is to be developed.

In this embodiment, the non-display area includes a storage area for storing data for defining skeletons, model data for defining polygons, animation data for animating the models, pattern data indicating the contents of the respective animations, texture data, color palette data, etc.

Here, the texture data are (2D) image data, whereas the color palette data are data for designating the color of the texture data or the like. These data are read from the storage medium 200 at once or a plurality of times so as to conform to the progress of the game and saved in the non-display area of the buffer 21 by means of the CPU 1.

Imaging commands include an imaging command for generating solid 3D images using polygons and an imaging command for generating usual 2D images. Here, the polygons are polygonal 2D virtual figures: triangle figures are used in this embodiment.

The imaging command for generating a solid 3D image using the polygons is comprised of polygon vertex data in the display area of the buffer 21, texture address data representing stored positions of the texture data to be adhered to the polygons in the buffer 21, color palette address data representing stored positions of the color palette data indicating the color of the texture data in the buffer 21, and luminance data representing the luminance of the textures.

Among the above data, the polygon vertex address data in the display area are polygon vertex coordinate data in the 2D space obtained by applying a coordinate transform to polygon vertex coordinate data in the 3D space from the CPU 1 based on a movement amount data and a rotation amount data of a screen itself by means of the graphic data generating processor 3. Further, the luminance data are determined based on distances between the positions represented by the polygon vertex coordinate data after the coordinate transform and the virtually arranged light source by means of the graphic data generating processor 3.

The polygon vertex address data represent addresses in the display area of the buffer 21, and the image processor 10 writes a texture data corresponding to a range of the display area of the buffer 21 defined by three polygon vertex address data.

One object is formed by a multitude of polygons. The CPU 1 stores the coordinate data of the respective polygons in the 3D space in the buffer 21 in relation to vector data of the corresponding skeletons. The following processing is performed in the case that a character is moved on the display surface by operating the controller 29, i.e. a movement of the character itself is expressed or a point of viewing the character is changed.

Specifically, the CPU 1 feeds the 3D coordinate data of the vertices of the respective polygons held in the non-display area of the buffer 21 and the movement amount data and the rotation amount data of the respective polygons, which were obtained from the coordinates and the rotation amount data of the skeletons, to the graphic data generating processor 3.

The graphic data generating processor 3 successively calculates the 3D coordinate data of the respective polygons after the movement and rotation based on the 3D coordinate data of the vertices of the respective polygons and the movement amount data and the rotation amount data of the respective polygons.

Among the thus obtained 3D coordinate data of the respective polygons, those in horizontal and vertical directions are fed to the image processor 10 as the address data in the display area of the buffer 21, i.e. as the polygon vertex address data.

The image processor 10 writes a texture data represented by the texture address data allotted in advanced in the triangular display area of the buffer 21 defined by three polygon vertex address data. In this way, an object formed by adhering the texture data to a multitude of polygons is displayed on the display surface of the monitor 22.

The imaging command for generating a usual 2D image is comprised of vertex address data, texture address data, color palette address data representing stored positions of the color palette data indicating the color of the texture data in the buffer 21, and luminance data representing the luminance of the textures. Among these data, the vertex address data are coordinate data obtained by applying a coordinate transform to vertex coordinate data in the 2D space from the CPU 1 based on a movement amount data and a rotation amount data from the CPU 1 by means of the graphic data generating processor 3.

The sound processor 11 writes an ADPCM data read from the storage medium 200 in the buffer 23 to use the ADPCM data stored in the buffer 23 as a sound source. The sound processor 11 reads the ADPCM data based on a clock signal having a frequency of, e.g. 44.1 kHz.

The sound processor 11, applies various processings such as pitch conversion, addition of noise, envelope setting, level setting, addition of reverb to the ADPCM data read from the buffer 23.

If the sound data read from the storage medium 200 is a PCM data such as a compact disk digital audio (CD-DA) data, the read sound data is converted into the ADPCM data by the sound processor 11.

Further, processing of the PCM data by the program data is directly performed in the main memory 5. The PCM data processed in the main memory 5 is fed to the sound processor 11 and converted into an ADPCM data and then is outputted as a sound from the loudspeaker 25 after the aforementioned various processings are applied thereto.

The storage medium driver 27 is, for example, a CD-ROM drive, a hard disk driver, an optical disk drive, a flexible disk drive, a silicone disk drive, or a cassette medium reader.

The storage medium 200 is, for example, a CD-ROM, a hard disk, an optical disk, a flexible disk or a semiconductor memory.

The storage medium driver 27 reads the images, sounds and program data from the storage medium 200 and feeds the read data to the decoder 12. The decoder 12 applies error correction using an error correction code (ECC) to the reproduced data from the storage medium driver 27, and feeds the resulting data to the main memory 5 or the sound processor 11.

The memory 28 is, for example, a holder or a card type memory. The card type memory is adapted to hold various game parameters so as to hold a state, for example, when the game is interrupted midways.

The controller 29 is an operation means operable from the outside, is provided with a first left button 29L1, a second left button 29L2, a first right button 29R1, a second right button 29R2, an up-key 29U, a down-key 29D, a left-key 29L, a right-key 29R, a start button 29a, a select button 29b, a first button 29c, a second button 29d, a third button 29e, a fourth button 29f, a left stick 29SL and a right stick 29SR, and is adapted to send an operation signal corresponding to the operation of a game player to the CPU 1.

The up-key 29U, the down-key 29D, the left-key 29L and the right-key 29R are used by the game player to give commands to move, for example, a character or a cursor on the screen of the monitor 2 to the CPU 1.

The start button 29a is operated by the game player to instruct the start of the game program data loaded from the storage medium 200 to the CPU 1. The select button 29b is operated by the game player to instruct various selections concerning the game program data to be loaded in the main memory from the storage medium 200 to the CPU 1.

The respective buttons and keys of the controller 29 except the left stick 29SL and the right stick 29SR are on-off switches which are turned on from their neutral positions by a pressing force from the outside and returned to the neutral positions upon being freed from the pressing force.

The left and right sticks 29SL, 29SR are stick-shaped controllers having substantially the same construction as a so-called joystick. Specifically, the controller 29 has a standing stick, which can be inclined to front, back, left, right or in any direction in a 360° range about a specified point of the stick as a supporting point. According to the direction and angle of inclination of the stick, an X-coordinate along transverse direction and a Y-coordinate along forward/backward direction in coordinate systems having the standing position of the stick as an origin are sent as an operation signal to the CPU 1 via the interface circuit 13.

The functions of the first left button 29L1, the second left button 29L2, the first right button 29R1 and the second right button 29R2 differ depending on the game program data to be loaded from the storage medium 200.

Next, the operation of this game system is summarily described. A power switch (not shown) is turned on to apply a power to the game system. At this time, if the storage medium 200 is mounted in the storage medium driver 27, the CPU 1 instructs the storage medium driver 27 to read the program data from the storage medium 200 in accordance with the operating system stored in the ROM 6. In response to this instruction, the storage medium driver 27 reads the images, sounds and program data from the storage medium 200. The read images, sounds and program data are fed to the decoder 12, where error correction is applied thereto.

The image data to which error correction was applied in the decoder 12 are fed via the bus line 2 to the expanding circuit 7, where the aforementioned expansion is applied thereto. The resulting image data are fed to the image processor 10, which in turn writes them in the non-display area of the buffer 21.

The sound data to which error correction was applied in the decoder 12 are either written in the main memory 5 or fed to the sound processor 11 to be written in the buffer 23.

The program data to which error correction was applied in the decoder 12 are written in the main memory 5. Hereafter, the CPU 1 executes the game in accordance with the game program data stored in the main memory 5 and contents of instructions given by the game player via the controller 29. In other words, the controller 29 suitably controls image processing, sound processing and internal processing based on the contents of instructions given by the game player via the controller 29.

In this embodiment, the control for the image processing includes, for example, calculation of the coordinates of the respective skeletons and calculation of the vertex coordinate data of the respective polygons based on a pattern data corresponding to an animation instructed for the character, feed of the obtained 3D coordinate data and a viewing point data to the graphic data generating processor 3, issuance of the imaging commands including the address data in the display area of the buffer 21 calculated by the graphic data generating processor 3 and the luminance data. The control for the sound processing includes, for example, issuance of sound output commands to the sound processor 11 and designation of levels, reverbs, etc. The control for the internal processing includes, for example, calculation according to the operation of the controller 29.

Figure 2A:
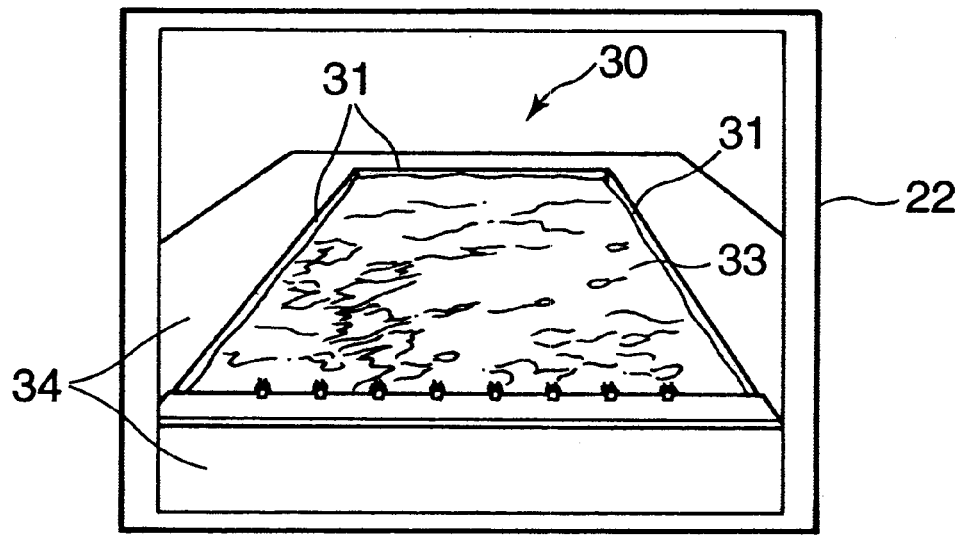
FIGS. 2A and 2B are diagrams showing scenes of a game displayed on a monitor.
Figure 2B:
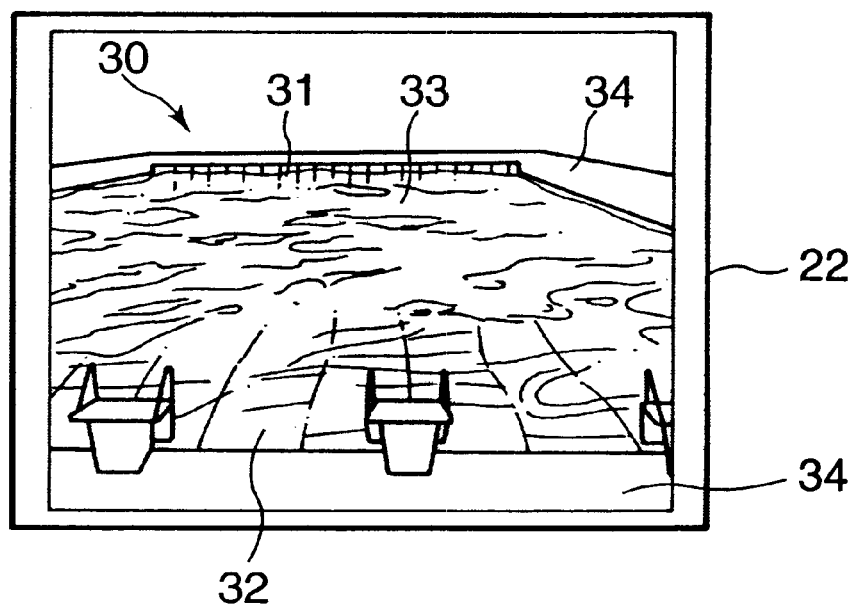

Next, with reference to FIG. 2, images displayed in the video game executed in this game system are summarily described. FIGS. 2A and 2B are diagrams showing scenes of the game displayed on the monitor.

In this video game, a pool model 30 simulating a swimming pool is displayed on the monitor 22 as shown in FIGS. 2A and 2B. This pool model 30 is comprised of a side wall model 31 simulating the side walls of the swimming pool, a bottom wall model 32 simulating the bottom wall of the swimming pool, a water surface model 33 simulating the water surface of the swimming pool, a poolside model 34 simulating the poolside of the swimming pool, etc.

FIG. 2A shows an image of the pool model 30 viewed from a specified height, and FIG. 2B shows an image of the pool model 30 viewed from a viewing point lower than that in FIG. 2A, e.g. a viewing point of a human character appearing in the game.

In the real swimming pool, a pattern drawn at the bottom, e.g. course lines look swaying because refractive index is changed by waves on the water surface when the bottom of the swimming pool is viewed at the same viewing point. Accordingly in this embodiment, the bottom wall model 32 is formed by an uneven polygon set instead of a flat polygon set, and such an effect as to cause the pattern to look swaying due to a change in refractive index is attained in a simulated manner by moving the uneven polygon set. In this way, realistic image display is realized.

Figure 3:
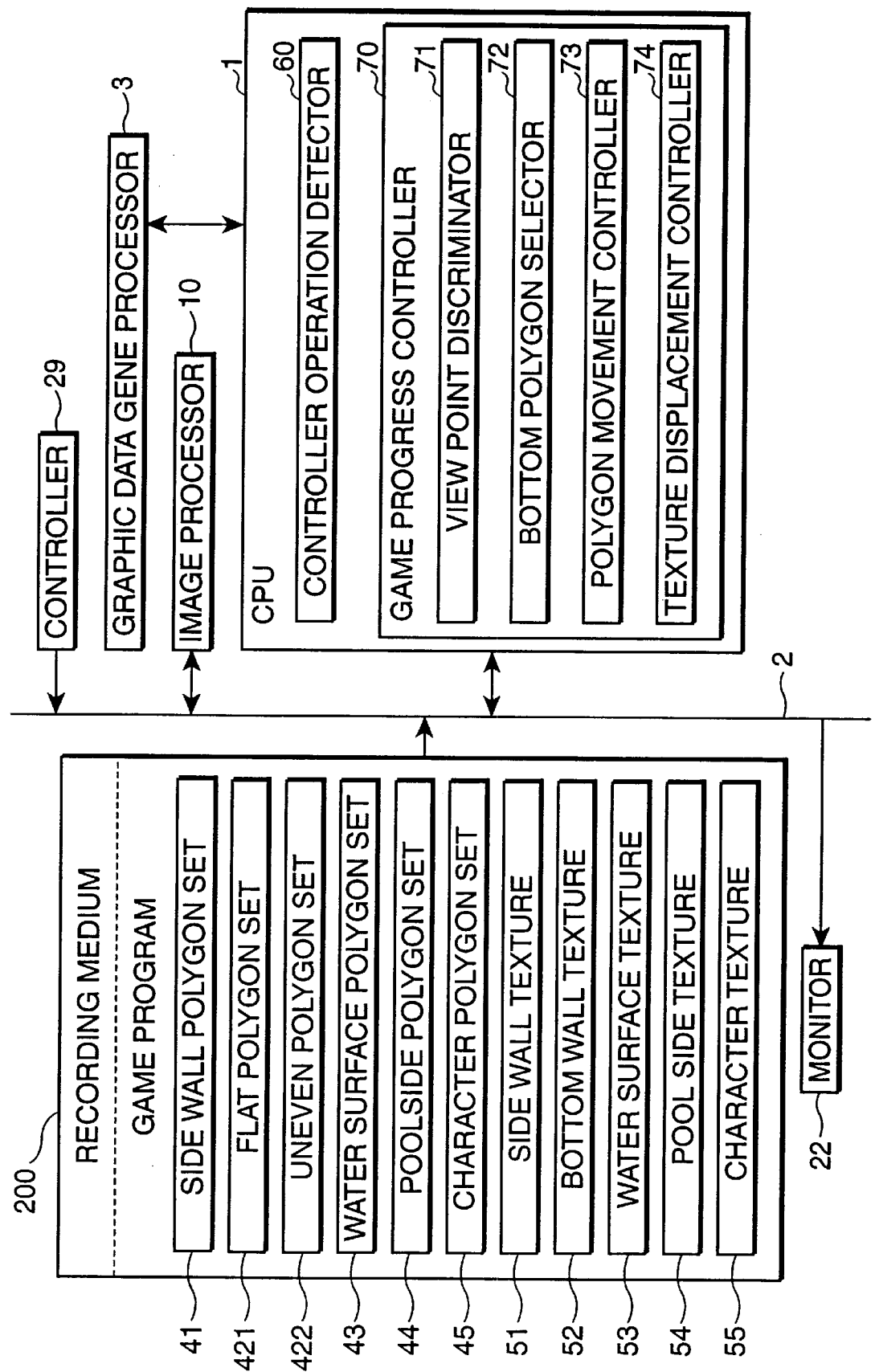
FIG. 3 is a block diagram showing functions of a CPU and an essential portion of FIG. 1, FIGS. 4A, 4B and 4C are wire frame diagrams showing a polygon set stored in a storage medium.

Next, the functions of the CPU1 and other elements are described with reference to FIGS. 3 to 6. FIG. 3 is a block diagram showing functions of the CPU 1 and an essential portion of FIG. 1.

In FIG. 3, such a game program as to display the pool model 30 (see FIG. 2) is stored in the storage medium 200. This game program is provided with the aforementioned various models forming the pool model 30 and set in the virtual 3D space. These models are formed by polygon sets including a plurality of polygons, and are displayed as an image on the monitor 22 after adhering the textures to the polygon sets.

The game pro gram stored in the storage medium 200 is provided with a side wall polygon set 41 for forming the side wall model 31 (see FIG. 2), a flat polygon set 421 and an uneven polygon set 422 for forming the bottom wall model 32 (see FIG. 2), a water surface polygon set 43 for forming the water surface model 33 (see FIG. 2), a poolside polygon set 44 for forming the poolside model 34 (see FIG. 2), character polygon sets 45 for forming characters appearing in the game, etc.

This game program is also provided with side wall textures 51 to be adhered to the side wall polygon set 41, bottom wall textures 52 to be adhered to the flat polygon set 421 and the uneven polygon set 422, water surface textures 53 to be adhered to the water surface polygon set 43, poolside textures 54 to be adhered to the poolside polygon set 44, character textures 55 to be adhered to the character polygon sets 45, etc.

Here, the constructions of these polygon sets and models are described with reference to FIGS. 4 to 6. FIGS. 4A, 4B and 4C are wire frame diagrams showing a polygon set stored in the storage medium 200, FIGS. 5A and 5B are wire frame diagrams showing the construction of the pool model, and FIGS. 6A, 6B and 6C are diagram showing how the bottom wall textures are adhered.

Figure 4A:
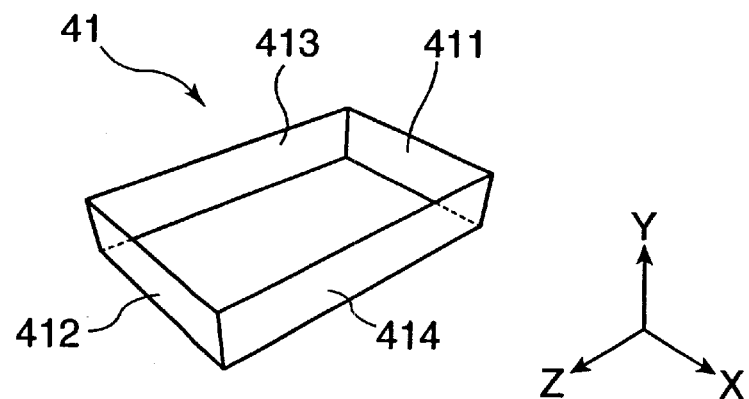
Figure 5A:
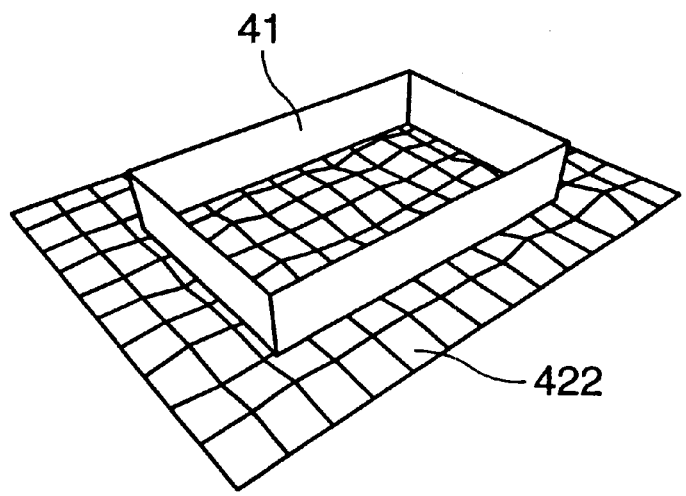
FIGS. 5A and 5B are wire frame diagrams showing a construction of a pool model.
Figure 5B:
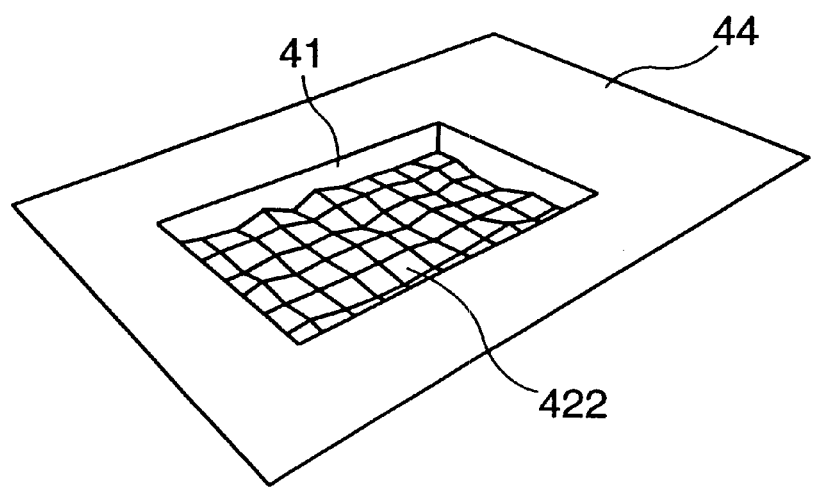

3D world coordinate systems (X,Y,Z) shown in FIG. 4A are coordinate systems set in the virtual 3D space, and polygons for forming the models and characters are described using the world coordinate systems (X,Y,Z).

FIG. 4A shows the side wall polygon set 41 for forming the side wall model 31. This side wall polygon set 41 is comprised of four side wall polygon sets 411 to 414. A pair of polygon sets 411, 412 and a pair of polygon sets 413, 414 which are facing each other are, for example, rectangular and the pool model 30 in the form of a rectangular parallelepiped is constructed by these polygon sets.

In this embodiment, a plane including the upper ends of the side wall polygon sets 411 to 414 and a plane including the bottom ends thereof are set parallel to an X-Z plane, and boundary lines between adjacent side wall polygon sets (lines with which the respective polygon sets are in contact) are set parallel to Y-axis.

Figure 4B:
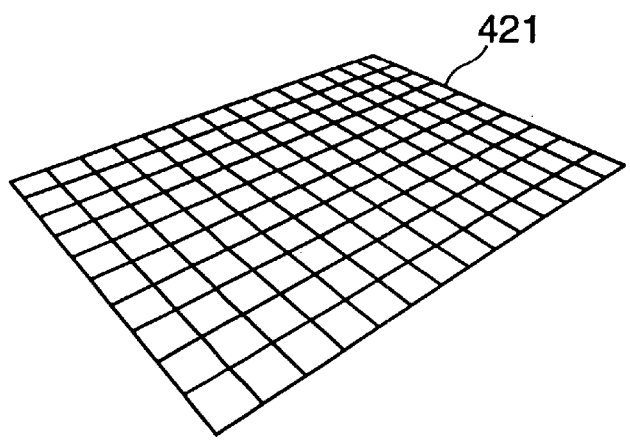

FIG. 4B shows the flat polygon set 421 for forming the bottom wall model 32. This flat polygon set 421 is such that a plurality of polygons are arrayed on the same plane: on the X-Y plane in this embodiment.

Figure 4C:
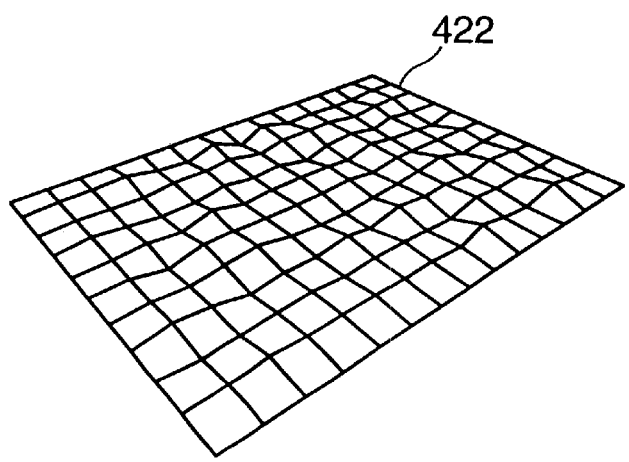

FIG. 4C shows the uneven polygon set 422 for forming the bottom wall model 32. This uneven polygon set 422 is formed by displacing the Y-coordinates of at least part of the flat polygon set 421. In this embodiment, the swaying state of the pattern at the bottom of the swimming pool caused by a change in refractive index by waves on the water surface is expressed in a simulated manner using the uneven polygon set 422 shown in FIG. 4C.

The side wall model 31 and the bottom wall model 32 are constructed as shown in FIG. 5A by combining the side wall polygon set 41 shown in FIG. 4A and the uneven polygon set 422 shown in FIG. 4C. The pool model 30 is constructed by further arranging the poolside polygon set 44 outside the side wall polygon set 41 as shown in FIG. 5B.

Figure 6A:
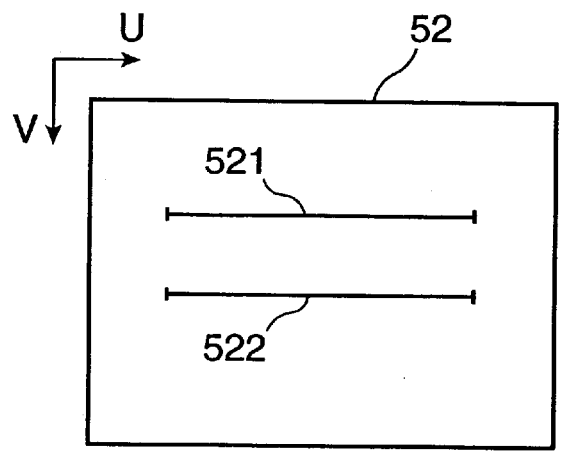
FIGS. 6A, 6B and 6C are diagram showing how a bottom wall texture is adhered.

FIG. 6A shows the bottom wall texture 52. The texture data is a 2D image data as described with reference to FIG. 1, and is described using 2D coordinate systems (U,V) as shown in FIG. 6A in this embodiment. This bottom wall texture 52 expresses course lines 521, 522 parallel to each other.

The flat polygon set 421 and the uneven polygon set 422 for forming the bottom wall model are both set parallel to the X-Z plane. Accordingly, the bottom wall model looks as shown in FIG. 6b if being viewed in a Y-axis direction with the bottom wall texture 52 adhered to the flat polygon set 421.

At this time, the bottom wall texture 52 is adhered using the U-, V-coordinates so as to be located in the center of the flat polygon set 421.

Figure 6B:
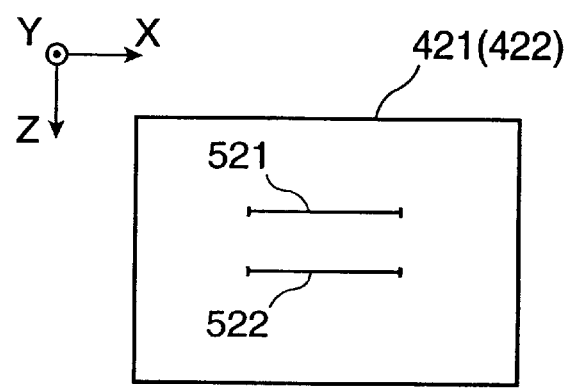

On the other hand, since the uneven polygon set 422 is formed by displacing the Y-coordinates of at least part of the polygons of the flat polygon set 421, the course lines 521, 522 look straight as shown in FIG. 6B if the uneven polygon set 422 to which the bottom wall texture 52 is adhered is viewed in the of Y-axis. Therefore, the uneven state cannot be distinguished.

Figure 6C:
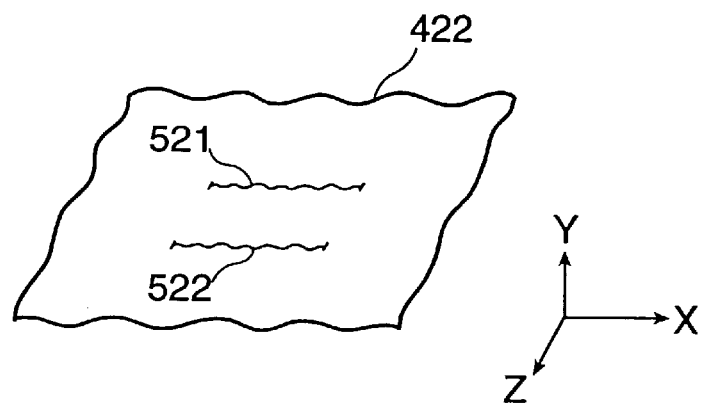

Contrary to this, if the uneven polygon set 422 to which the bottom wall texture 52 is adhered is viewed in an oblique direction, the course lines 521, 522 look waving as shown in FIG. 6C. At this time, the bottom wall texture 52 is so adhered to cover all the polygons of the uneven polygon set 422.

Although the triangular polygons are used in this embodiment as described above, individual polygons are not shown in FIGS. 4 and 5 to facilitate the description, and each of the individual rectangles shown in FIGS. 4 and 5 does not correspond to one polygon.

Referring back to FIG. 3, the CPU 1 is provided with a controller operation detector 60 and a game progress control unit 70 as function blocks. The controller operation detector 60 has a function of detecting operated states of the respective buttons and keys of the controller 29 in accordance with the operation signals outputted from the controller 29.

The game progress control unit 70 controls the operation of the respective elements shown in FIG. 1 in accordance with the operated state of the controller 29 which is detected by the controller operation detector 60 and the game program stored in the storage medium 200 and has, for example, following functions.

(1) Function of instructing the image processor 10 to display an image at a specified angle of view in a specified viewing direction from a specified viewing point in accordance with the game program. On the monitor 22 is displayed an image having a viewing point, a viewing direction and an angle of view set beforehand, for example, by the game program is displayed out of the models set in the virtual 3D.

Further, in the case of displaying an image viewed by the character moved according to the operation of the controller 29 by the game player, the viewing point and the viewing direction are set based on the operated state of the controller 29 which is detected by the controller operation detector 60, and the image having the set viewing point and viewing direction is displayed.

(2) Function of moving the character with respect to the pool model 30 according to the operation of the controller 29 by the game player.

(3) Function of causing the image processor 10 to deform the water surface textures 53 by applying rippling and to perform mapping to adhere the deformed water surface textures 53 to the water surface polygon set 43. At this time, the luminance of the polygon reflecting a light from a virtual light source toward the viewing point is set higher according to the angle of each polygon of the water surface polygon set 43 and the transparency of the water surface texture 53 to be adhered to this polygon is set lower, e.g. set at white. On the other hand, the transparency of the water surface texture 53 to be adhered to the polygon not reflecting the light toward the viewing point is set higher.

Further, the game progress control unit 70 is provided with a viewing point discriminating device 71, a bottom wall polygon selecting device 72, a polygon movement controller 73 and a texture displacement controller 74 as function blocks.

The viewing point discriminating device 71 has a function of discriminating whether the viewing point when the image is displayed on the monitor 22 is located above or below (under water) the water surface polygon set 43.

The bottom wall polygon selecting device 72 has a function of selecting, as the polygon set for forming the bottom wall model 32, the uneven polygon set 422 when the viewing point is located above the water surface polygon set 43 while selecting the flat polygon set 421 when the viewing point is under water. Further, the bottom wall polygon selecting device 72 instructs the image processor 10 to generate an image using the selected polygon set.

The polygon movement controller 73 has a function of moving the uneven polygon set 422 with respect to the side wall polygon set 41 when this polygon set 422 is selected. This movement is made in accordance with a movement procedure described as the game program. In this embodiment, the uneven polygon set 422 is reciprocated at a specified speed by a specified distance in specified directions, for example, in parallel to the X-Z plane.

Specifically, the polygon movement controller 73 instructs, to the graphic data generating processor 3, a movement amount by which the polygon set 422 is to be moved during the lapse of the predetermined T (e.g. T=1/60 sec.) by the movement procedure, e.g. ($\Delta X$, $\Delta Z$) in this embodiment, every time the predetermined time lapses.

Since the uneven polygon set 422 is moved with respect to the side wall polygon set 41, the pattern at the bottom of the pool model 30 is moved on the screen when being displayed on the monitor 22 if the bottom wall textures 52 are moved as the uneven polygon set 422 is moved.

The texture displacement controller 74 has a function of instructing the image processor 10 to displace adhering coordinates of the bottom wall texture 52 to the uneven polygon set 422 in an opposite direction by the above movement amount every time the predetermined time T lapses. In other words, the texture displacement controller 74 instructs to displace them only by ($-\Delta X, -\Delta Z$) in this embodiment.

The above function prevents the pattern at the bottom of the pool model 30 from moving on the screen when being displayed on the monitor 22.

Since the uneven polygon set 422 is uneven (i.e. coordinates of the vertices of the respective polygons are displaced in the Y-axis direction with respect to the X-Z plane), the polygon movement controller 73 adjusts the positions in the Y-axis direction of the polygons located in contact with the base of the side wall polygon set 41 lest a clearance should be formed at a boundary with the base of the side wall polygon set 41.

Next, with reference to FIGS. 2, 3 and 7, an image generating operation of the bottom wall model is described with reference to a flow chart of FIG. 8. FIGS. 7A, 7B and 7C are diagrams showing the bottom wall model to explain how the bottom wall textures are adhered to the uneven polygon set, and FIG. 8 is a flow chart showing an image generating procedure of the bottom wall model.

In a routine different from the one shown in FIG. 8, it is discriminated whether the viewing point is located above or below (under water) the water surface model 33. If the viewing point is under water; the flat polygon set 421 is selected, the bottom wall texture 52 is so adhered to entirely cover the selected flat polygon set 421; and an image having a specified angle of view is generated and stored in the buffer 21.

Figure 8:
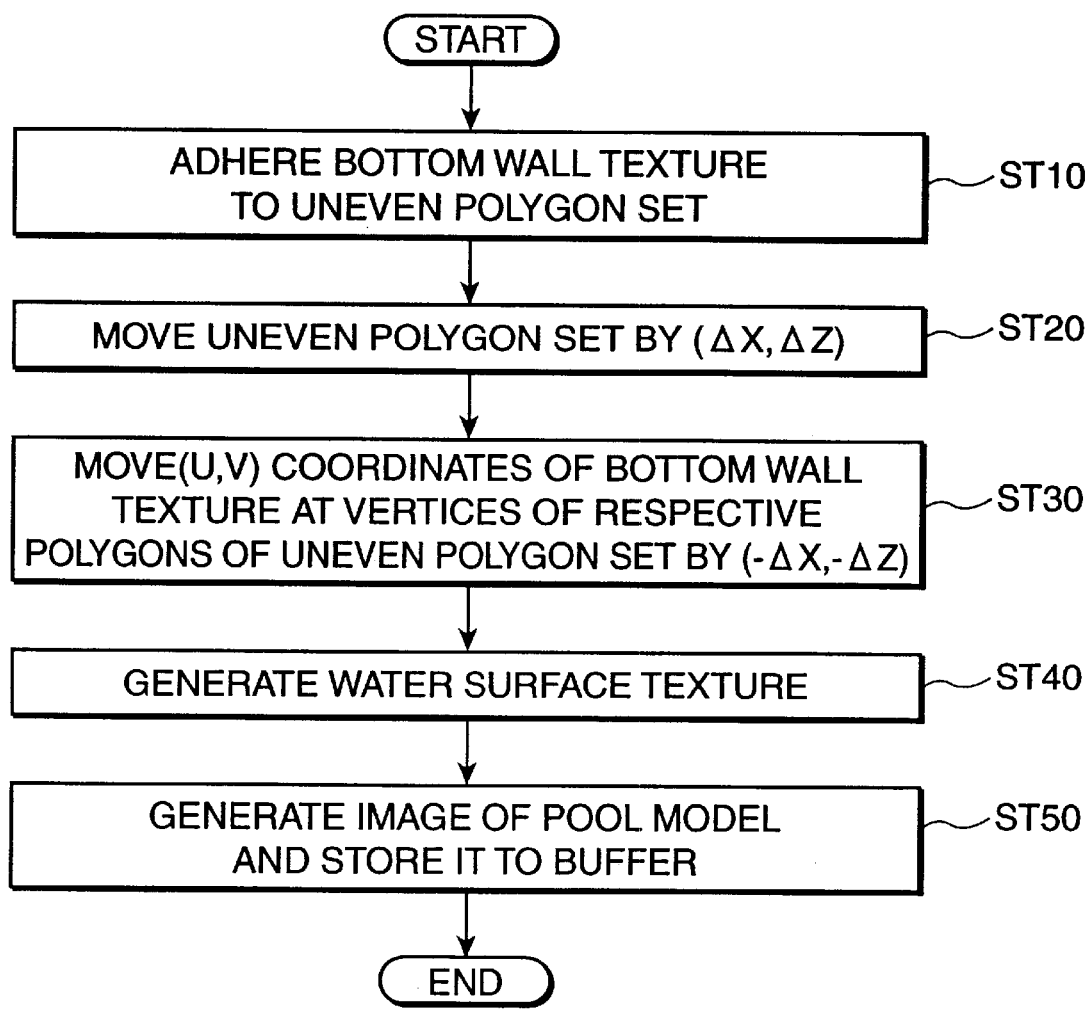
FIG. 8 is a flow chart showing an image generating procedure of the bottom wall model.

On the other hand, if the viewing point is above the water surface model 33, the uneven polygon set 422 is selected and the routine of FIG. 8 is entered.

First, in Step ST10, the bottom wall texture 52 is so adhered to entirely cover the selected uneven polygon set 422. In this way, an image of the bottom wall model 32 having the course lines 521, 522 in specified positions is generated as shown in FIG. 7A.

Subsequently, in Step ST20, the uneven polygon set 422 is moved, for example, by ($\Delta X, \Delta Z$). For example, the uneven polygon set 422 is moved by ($\Delta x, \Delta Z$) in a direction of an arrow from a state of FIG. 7A to reach a state of FIG. 7B.

Figure 7A:
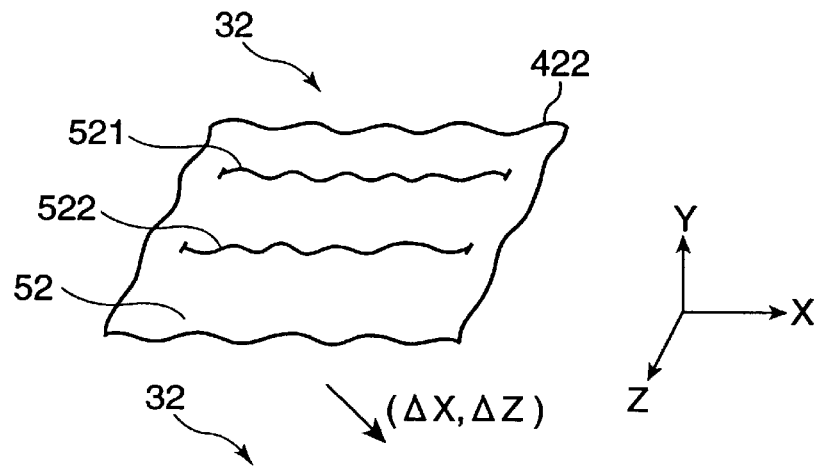
FIGS. 7A, 7B and 7C are diagrams showing a bottom wall model to explain how the bottom wall texture is adhered to an uneven polygon set.
Figure 7B:
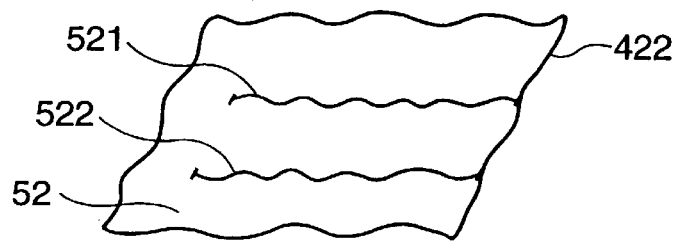

Since the uneven polygon set 422 is moved, the outer periphery of the bottom wall model 32 differs in FIGS. 7A and 7B. On the other hand, the positions of the course lines 521, 522 are displaced only by (ΔX,ΔZ) in FIGS. 7A and 7B, but the uneven configuration thereof are same since the adhering coordinates of the bottom wall texture 52 are not changed.

Subsequently, in Step ST30, (U,V) coordinates of the bottom wall texture 52 at the vertices of the respective polygons of the uneven polygon set 422 are moved by (−ΔX,−ΔZ). For example, the uneven polygon set 422 is moved by (−ΔX,−ΔZ) in a direction of an arrow from the state of FIG. 7B to reach a state of FIG. 7C.

Figure 7C:
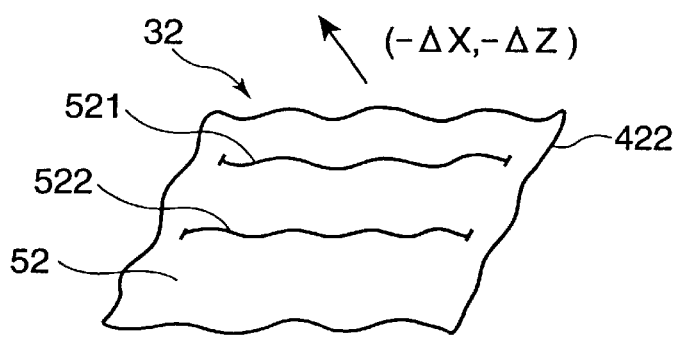

The outer periphery of the bottom wall model 32 is same in FIGS. 7B and 7C since the uneven polygon set 422 is not moved on the other hand, the positions of the course lines 521, 522 are displaced by (−ΔX,−ΔZ) in FIGS. 7B and 7C and are same in FIGS. 7A and 7C since the adhering coordinates of the bottom wall texture 52 are changed. Further, the uneven configuration of the course lines 521, 522 in FIG. 7C differs from the one in FIG. 7A.

In other words, the positions of the course lines 521, 522 are same and the uneven configuration differs in FIG. 7A showing the state before the operation of Step ST10 and FIG. 7c showing the state after the operation of Step ST30.

Subsequently, the water surface model 33 is generated using the water surface polygon set 43 and the water surface textures 53 (Step ST40); and the water surface model 33 is placed on the bottom wall model 32 to generate an image of the pool model 30 having a specified angle of view including the other models and characters and the generated pool model 30 is stored in the buffer 21 (Step ST50). In this way, the bottom wall model 32 is displayed on the monitor 22 according to the transparency of the water surface model 33. This routine is repeated at intervals of the predetermined time T (one frame, e.g. T=1/60 sec. in this embodiment).

As described above, according to this embodiment, the bottom wall model 32 is formed by the uneven polygon set 422; this uneven polygon set 422 is moved and displaced in the opposite direction by the movement amount of the adhering coordinates of the bottom wall texture 52 to maintain the pattern of the texture at the same position. Since the polygon s of the uneven polygon set to which the bottom wall texture 52 is adhered become different, the uneven configuration of the bottom wall texture 52 becomes different.

Thus, such an effect as to make the pattern of the bottom wall model 32 look as if it were swaying due to a change in refractive index can be obtained and realistic images can be displayed on the monitor 22 by a simple construction.

Figure 9:
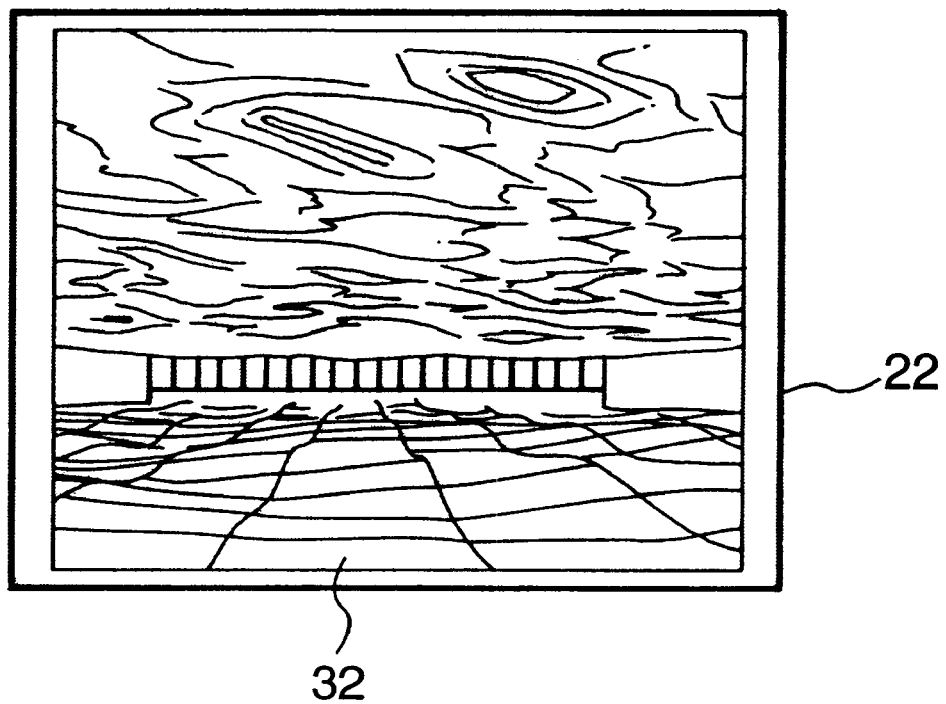
FIG. 9 is a diagram showing a state where the uneven bottom wall model is displayed on the monitor when a viewing point is under water.

In the real swimming pool, refractive index is not changed by the waves on the water surface when the viewing point is located under water. Further, if the uneven polygon set 422 is used as the polygon set for forming the bottom wall model 32 when the viewing point is located under water, the uneven bottom wall model 32 is displayed on the monitor 22 as shown in FIG. 9, which makes the displayed image incongruous.

Contrary to this, in this embodiment, whether or not the viewing point is located under water is discriminated, and the flat polygon set 421 is used as the polygon set for forming the bottom wall model 32 when the viewing point is located under water. This prevents an incongruous image as shown in FIG. 9 from being displayed.

Further, in this embodiment, the uneven polygon set 422 has an area larger than the one enclosed by the side wall polygon set 41 (e.g. 1.5 to 2 times in this embodiment). Thus, even if the uneven polygon set 422 is moved, no clearance is formed between it and the side wall polygon set 41 and, therefore, the bottom wall model 32 can be suitably constructed as shown in FIGS. 10A to 10C.

Figure 10A:
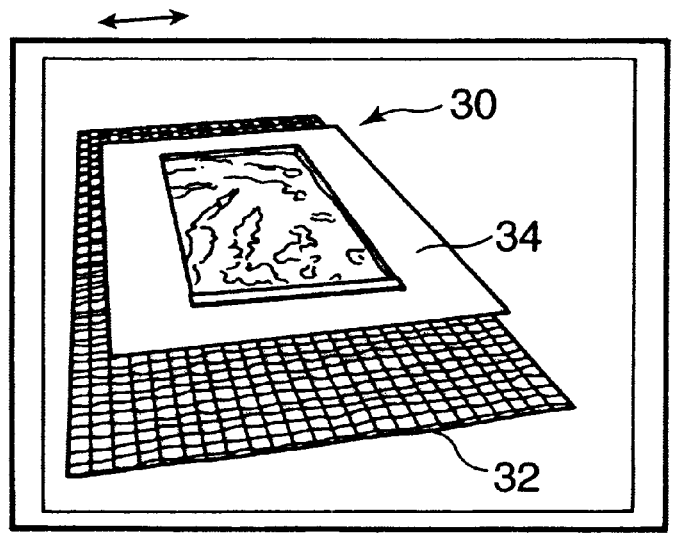
FIGS. 10A, 10B and 10C are diagrams showing a pool model set in a virtual 3D space.
Figure 10B:
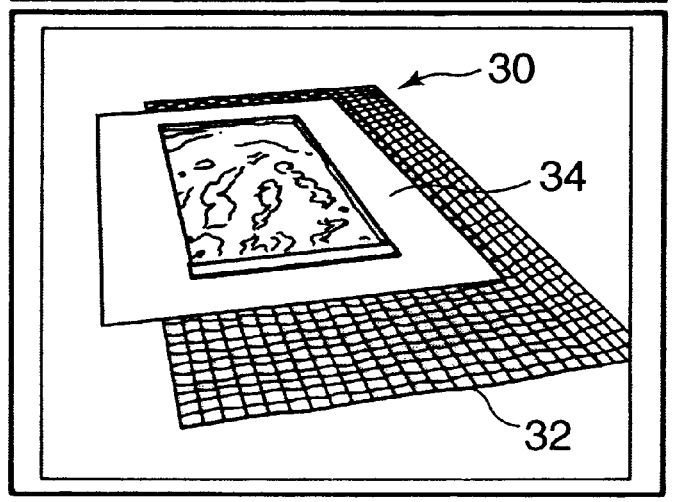
Figure 10C:
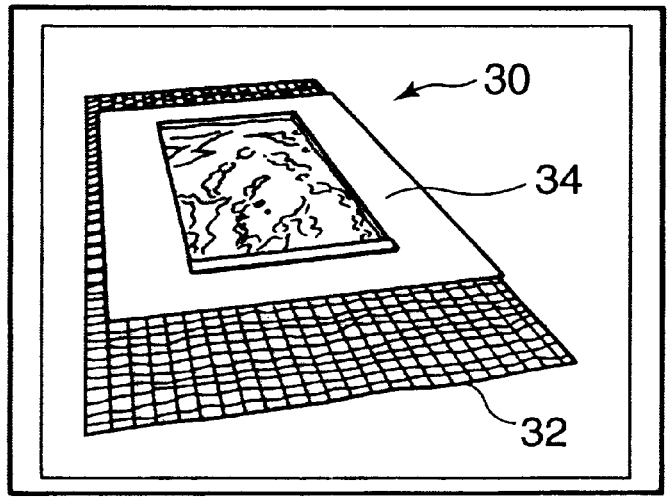

FIGS. 10A, 10B and 10C show the pool model 30 set in the virtual 3D space, particularly showing a reciprocating state of the bottom wall model 32 in directions of arrows in the order of 10A, 10B and 10C.

During the display on the monitor 22, an angle of view is so set as not to display the outside of the poolside model 34 on the monitor 22. This enables the bottom wall model 32 to be suitably displayed on the monitor 22.

The present invention is not limited to the foregoing embodiment and may be modified as follows.

(1) Although the uneven polygon set 422 is reciprocated in parallel to the X-Z plane in the foregoing embodiment, the movement mode is not limited thereto. For instance, it may be moved along a circumference of a circle having a specified radius about a specified point on the X-Z plane. In such a case, a trace of movement is of a polygon shape since the movement amount is instructed at intervals of the predetermined time T.

The movement of the uneven polygon set 422 is not limited to the reciprocal movement and the movement on the circumference, and may make an irregular movement. In such a case, the game progress controller 70 may be provided with a random number generating function, and the polygon movement controller 73 may instruct a movement amount corresponding to the generated random number.

(2) Although one uneven polygon set 422 is used in the foregoing embodiment, the present invention is not limited thereto. Two uneven polygon sets having different uneven configurations may be stored in the storage medium 200. The bottom wall model may be formed by the uneven polygon set having steep unevenness when the waves of the water surface model are large while being formed by the uneven polygon set having moderate unevenness when those of the water surface model are small.

(3) Although the swaying state of the pattern at the bottom caused by a change in refractive index by the waves on the water surface is displayed in a simulated manner in the foregoing embodiment, the present invention is not limited thereto.

For example, a bobbing state of course ropes floating on the water surface of the swimming pool may be displayed in a simulated manner by forming the water surface model by the uneven polygon set.

Further, a curtain, a flag or like cloth streaming or fluttering in the wind can be displayed in a simulated manner by forming a cloth model simulating a cloth by the uneven polygon set.

Furthermore, a wave-like pattern made on the desert or dune by the wind or irregularly protuberant lava at the crater can be displayed in a simulated manner by forming a sand-and-earth model simulating sand and rocks by the uneven polygon set.

Further, an amoeboid movement can be displayed in a simulated manner by forming an ameba-like body by the uneven polygon set.

(4) The present invention is applicable not only to a video game device, but also to an image generating device for generating models as in the foregoing embodiment and modifications (1) to (3) in a simulated manner.

As described above, the inventive image generating device for displaying the model comprised of a plurality of polygons set in the virtual 3D space and simulating an object having at least one flat plane comprises the polygon storage means for storing the coordinates of the uneven polygon set formed by arranging the plurality of polygons so as to be uneven with respect to one plane, the texture storage means for storing the object textures to be adhered to the respective polygons of the uneven polygon set, the coordinate processing means for moving the uneven polygon set by the specified amount in the specified direction, the image processing means for adhering the object textures to the respective polygons of the uneven polygon set, and the texture displacement control means for displacing the adhering coordinates of the object textures to the respective polygons by substantially the specified amount in substantially the opposite direction from the specified direction in which the uneven polygon set is moved when the object textures are adhered to the respective polygons of the uneven polygon set.

With this construction, when the uneven polygon set formed by arranging the plurality of polygons to be uneven with respect to the one plane is moved by the specified amount in the specified direction and the object textures are adhered to the respective polygons of the uneven polygon set, the adhering coordinates of the object textures to the respective polygons are displaced by substantially the specified amount in substantially the opposite direction from the specified direction in which the uneven polygon set is moved. Accordingly, the object textures have inclinations of their adhering surfaces changed while being held at the same position. As a result, an image in which the pattern of the thin model sways can be easily and realistically displayed on the display means.

The image generating device may be further provided with the second polygon storage means for storing the coordinates of the liquid surface polygon set comprised of a plurality of polygons set in the virtual 3D space and forming the liquid surface model simulating the surface of the liquid, the second texture storage means for storing the liquid surface textures to be adhered to the respective polygons of the liquid surface polygon set, the second coordinate processing means for determining the coordinates of the respective polygons forming the liquid surface polygon set and arranging the liquid surface polygon set at the side of the viewing point with respect to the uneven polygon set, and the second image processing means for adhering the liquid surface textures to the respective polygons of the liquid surface polygon set at a specified transparency.

With this construction, the coordinates of the respective polygons of the liquid surface polygon set comprised of the plurality of polygons set in the 3D space and forming the liquid surface model simulating the surface of the liquid are determined, this liquid surface polygon set is arranged at the side of the viewing point with respect to the uneven polygon set, and the liquid surface textures are adhered to the respective polygons at the specified transparency. Accordingly, the thin model is displayed through the liquid surface model on the display means. At this time, since an image in which the pattern of the thin model sways is displayed, such an image display as to make the pattern at the bottom of the water look swaying due to a change in refractive index caused by the waves on the liquid surface can be easily and realistically realized.

Further, the liquid surface model may simulate the water surface of the swimming pool; the model may simulate the bottom wall of the swimming pool; the second polygon storage means may store the coordinates of the side wall polygon set comprised of a plurality of polygons set in the virtual 3D space and forming the side wall model simulating the side walls of the swimming pool; the second texture storage means may store the side wall textures to be adhered to the respective polygons of the side wall polygon set; the coordinate processing means may move the uneven polygon set within the one plane; and the bottom wall model may be set larger than an area enclosed by the side wall model.

With this construction, such an image display as to make the pattern at the bottom of the swimming pool look swaying due to a change in refractive index caused by the waves on the water surface can be easily and realistically realized by simulating the side walls of the swimming pool by the side wall polygon set and the side wall textures, simulating the bottom wall thereof by the bottom wall model, simulating the water surface thereof by the liquid surface model and moving the uneven polygon set within the one plane. Further, since the bottom wall model is set larger than the area enclosed by the side wall model, there is no likelihood that the bottom of the swimming pool is terminated at a position within the area enclosed by the side wall model.

There may be further provided the viewing point discriminating means for discriminating whether the viewing point when a display is made on the display means is located at the side of the bottom wall model or at the opposite side with respect to the liquid surface model, and the switching means for switching the bottom wall polygon set forming the bottom wall model based on the discrimination result of the viewing point discriminating means; the polygon storage means may further store the coordinates of the flat polygon set formed by arranging a plurality of polygons on the one plane; and the switching means causes the bottom wall model to be formed by the flat polygon set when the viewing point is located at the side of the bottom wall model while causing it to be formed by the uneven polygon set when the viewing point is located at the opposite side.

With this construction, a flat wall is displayed as the bottom wall of the swimming pool by forming the bottom wall model by the flat polygon set when the viewing point when the display is made on the display means is located at the side of the bottom wall model with respect to the liquid surface model, i.e. located under water. On the other hand, the swaying state of the pattern at the bottom caused by a change in refractive index by the waves on the water surface can be suitably displayed by forming the bottom wall model by the uneven polygon model when the viewing point is located at the opposite side, i.e. above the water surface.

Further, the coordinate processing means may regularly move the uneven polygon set. This enables a suitable display of the swaying state of the pattern at the bottom by a simple processing.

Alternatively, the coordinate processing means may irregularly move the uneven polygon set. This enables a more realistic image display since the pattern at the bottom randomly sways.

The inventive image generating method for displaying the model comprised of a plurality of polygons set in the virtual 3D space and simulating an object having at least one flat plane comprises the steps of storing the coordinates of the uneven polygon set formed by arranging the plurality of polygons so as to be uneven with respect to one plane; storing the object textures to be adhered to the respective polygons of the uneven polygon set; moving the uneven polygon set by the specified amount in the specified direction; and displacing the adhering coordinates of the object textures to the respective polygons by substantially the specified amount in substantially the opposite direction from the specified direction in which the uneven polygon set is moved when the object textures are adhered to the respective polygons of the uneven polygon set.

According to this method, when the uneven polygon set formed by arranging the plurality of polygons to be uneven with respect to the one plane is moved by the specified amount in the specified direction and the object textures are adhered to the respective polygons of the uneven polygon set, the adhering coordinates of the object textures to the respective polygons are displaced by substantially the specified amount in substantially the opposite direction from the specified direction in which the uneven polygon set is moved. Accordingly, the object textures have inclinations of their adhering surfaces changed while being held at the same position. As a result, an image in which the pattern of the thin model sways can be easily and realistically displayed on the display means.

Further, the inventive readable storage medium stores the image generating program for displaying the thin model comprised of a plurality of polygons set in the virtual 3D space and simulating an object having at least one flat plane, the image generating program comprising the coordinates of the uneven polygon set formed by arranging the plurality of polygons so as to be uneven with respect to one plane, the object textures to be adhered to the respective polygons of the uneven polygon set, the moving step of moving the uneven polygon set by the specified amount in the specified direction; and the displacing step of displacing the adhering coordinates of the object textures to the respective polygons by substantially the specified amount in substantially the opposite direction from the specified direction in which the uneven polygon set is moved when the object textures are adhered to the respective polygons of the uneven polygon set.

If the image generating program is executed by reading this readable storage medium by a computer, when the uneven polygon set formed by arranging the plurality of polygons to be uneven with respect to the one plane is moved by the specified amount in the specified direction and the object textures are adhered to the respective polygons of the uneven polygon set, the adhering coordinates of the object textures to the respective polygons are displaced by substantially the specified amount in substantially the opposite direction from the specified direction in which the uneven polygon set is moved. Accordingly, the object textures have inclinations of their adhering surfaces changed while being held at the same position. As a result, an image in which the pattern of the thin model sways can be easily and realistically displayed on the display means.

Further, the inventive video game device comprises the image generating means including any one of the aforementioned image generating devices, the character storage means for storing the specified character set in the virtual 3D space, the externally operable operation means for outputting the operation signal corresponding to the operated state thereof, and the game progress control means for moving the character with respect to the thin model and displaying it on the display means in accordance with the operation signal.

With this construction, when the operation means is externally operated, the operation signal corresponding to the operated state is outputted and the specified character is moved with respect to the thin model and displayed on the display means in accordance with the operation signal. Thus, a game image in which the pattern of the thin model sways can be easily and realistically displayed on the display means.

This application is based on Japanese patent application serial no. 2000-125260 filed on Apr. 26, 2000, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image generating device for displaying a model comprised of a plurality of polygons set in a virtual 3D space and simulating an object having at least one flat plane, the image generating device comprising:

polygon storage means for storing coordinates of uneven polygon set formed by arranging the plurality of polygons so as to be uneven with respect to one plane of the model;

texture storage means for storing object textures to be adhered to the respective polygons of the uneven polygon set;

image processing means for adhering the object textures to the respective polygons of the uneven polygon set;

coordinate processing means for moving the uneven polygon set by a specified amount in a specified direction; and texture displacement control means for displacing the adhering coordinates of the object textures to the respective polygons moved by the coordinate processing means by an amount substantially equal to said specified amount in a substantially opposite direction from said specified direction in which the uneven polygon set is moved when the object textures are adhered to the respective polygons of the uneven polygon set, said object textures remaining adhered to the uneven polygon set after movement thereof in the substantially opposite direction.

2. The image generating device according to claim 1, wherein the object having at least one flat plane is generally plate-shaped.

3. The image generating device according to claim 2, further comprising:

second polygon storage means for storing coordinates of liquid surface polygon set comprised of a plurality of polygons set in a virtual 3D space and forming liquid surface model simulating the surface of liquid;

second texture storage means for storing liquid surface textures to be adhered to the respective polygons of the liquid surface polygon set;

second coordinate processing means for determining the coordinates of the respective polygons forming the liquid surface polygon set and arranging the liquid surface polygon set at a side of a viewing point with respect to the uneven polygon set; and second image processing means for adhering the liquid surface textures to the respective polygons of the liquid surface polygon set at a specified transparency.

4. The image generating device according to claim 3, wherein the liquid surface model simulates a water surface of a swimming pool; said model simulates the bottom wall of the swimming pool; second polygon storage means stores the coordinates of the side wall polygon set comprised of a plurality of polygons set in the virtual 3D space and forming a side wall model simulating the side walls of the swimming pool; the second texture storage means stores the side wall textures to be adhered to the respective polygons of the side wall polygon set; the coordinate processing means moves the uneven polygon set within one plane; and said bottom wall model is set larger than an area enclosed by the side wall model.

5. The image generating device according to claim 1, wherein the coordinate processing means irregularly moves the uneven polygon set.

6. An image generating device for displaying a model comprised of a plurality of polygons set in a virtual 3D space and simulating an object having at least one flat plane, the image generating device comprising:

polygon storage means for storing coordinates of uneven polygon set formed by arranging the plurality of polygons so as to be uneven with respect to one plane of the model, the model simulating a bottom wall of a swimming pool;

texture storage means for storing object textures to be adhered to the respective polygons of the uneven polygon set;

image processing means for adhering the object textures to the respective polygons of the uneven polygon set;

coordinate processing means for moving the uneven polygon set by a specified amount in a specified direction within one plane;

texture displacement control means for displacing the adhering coordinates of the object textures to the respective polygons by an amount substantially equal to said specified amount in a direction substantially opposite from said specified direction in which the uneven polygon set is moved when the object textures are adhered to the respective polygons of the uneven polygon set;

second polygon storage means for storing coordinates of liquid surface polygon set comprised of a plurality of polygons set in a virtual 3D space and forming a liquid surface model simulating the surface of liquid of the swimming pool and for storing coordinates of the side wall polygon set comprised of a plurality of polygons set in the virtual 3D space and forming a side wall model simulating the side walls of the swimming pool;

second texture storage means for storing liquid surface textures to be adhered to the respective polygons of the liquid surface polygon set and for storing side wall textures to be adhered to the respective polygons of the side wall polygon set;

second coordinate processing means for determining the coordinates of the respective polygons forming the liquid surface polygon set and arranging the liquid surface polygon set at a side of a viewing point with respect to the uneven polygon set;

second image processing means for adhering the liquid surface textures to the respective polygons of the liquid surface polygon set at a specified transparency;

viewing point discriminating means for discriminating whether the viewing point when a display is made on the display means is located at a side of the bottom wall model or at the opposite side with respect to the liquid surface model, said bottom wall model being set larger than an area enclosed by the side wall model; and switching means for switching the bottom wall polygon set forming the bottom wall model based on the discrimination result of the viewing point discriminating means; wherein the object having at least one flat plane is generally plate-shaped;

the polygon storage means further stores the coordinates of the flat polygon set formed by arranging a plurality of polygons on a one plane; and the switching means causes the bottom wall model to be formed by the flat polygon set when the viewing point is located at the side of the bottom wall model while causing it to be formed by the uneven polygon set when the viewing point is located at the opposite side.

7. The image generating device according to claim 1, wherein the coordinate processing means regularly moves the uneven polygon set.

8. An image generating method for displaying a model comprised of a plurality of polygons set in a virtual 3D space and simulating an object having at least one flat plane, said image generating method comprising the steps of:

storing coordinates of an uneven polygon set formed by arranging a plurality of polygons so as to be uneven with respect to one plane of the model;

storing object textures to be adhered to the respective polygons of the uneven polygon set;

adhering the object textures onto the respective polygons of the uneven polygon set;

moving the uneven polygon set by a specified amount in a specified direction; and displacing the adhering coordinates of the object textures to the respective polygons moved in said step of moving by an amount substantially equal to the specified amount in a substantially opposite direction from the specified direction in which the uneven polygon set is moved when the object textures are adhered to the respective polygons of the uneven polygon set, said object textures remaining adhered to the uneven polygon set after movement thereof in the substantially opposite direction.

9. The image generating method according to claim 8, wherein the object having at least one flat plane is generally plate-shaped.

10. A readable storage medium storing an image generating program for displaying a model comprised of a plurality of polygons set in a virtual 3D space and simulating an object having at least one flat plane, the image generating program comprising the steps of:

providing coordinates of an uneven polygon set formed by arranging the plurality of polygons so as to be uneven with respect to one plane of the model and object textures to be adhered to the respective polygons of the uneven polygon set;

adhering the object textures onto the respective polygons of the uneven polygon set;

moving the uneven polygon set by a specified amount in a specified direction; and displacing adhering coordinates of the object textures to the respective polygons moved in said step of moving by an amount substantially equal to the specified amount in a substantially opposite direction from the specified direction in which the uneven polygon set is moved when the object textures are adhered to the respective polygons of the uneven polygon set, said object textures remaining adhered to the uneven polygon set after movement thereof in the substantially opposite direction.

11. The readable storage medium according to claim 10, wherein the object having at least one flat plane is generally plate-shaped.

12. A video game device comprising:

an image generating device for displaying a model comprised of a plurality of polygons set in a virtual 3D space and simulating an object having at least one flat plane, the image generating device including:

polygon storage means for storing coordinates of uneven polygon set formed by arranging the plurality of polygons so as to be uneven with respect to one plane of the model;

texture storage means for storing object textures to be adhered to the respective polygons of the uneven polygon set;

image processing means for adhering the object textures to the respective polygons of the uneven polygon set;

coordinate processor means for moving the uneven polygon set by a specified amount in a specified direction; and texture displacement control means for displacing the adhering coordinates of the object textures to the respective polygons moved by the coordinate processing means by an amount substantially equal to said specified amount in a substantially opposite direction from said specified direction in which the uneven polygon set is moved when the object textures are adhered to the respective polygons of the uneven polygon set, said object textures remaining adhered to the uneven polygon set after movement thereof in the substantially opposite direction;

character storage means for storing a specified character set in the virtual 3D space;

operation means which is externally operable for outputting an operation signal corresponding to an operated state thereof; and game progress control means for moving the character with respect to the model and displaying it on the display means in accordance with the operation signal.

13. The video game device according to claim 12, wherein the object having at least one flat plane is generally plate-shaped.

* * * * *